United States Patent
Bouws et al.

(10) Patent No.: US 8,853,965 B2
(45) Date of Patent: Oct. 7, 2014

(54) LUMINARY CONTROL SYSTEMS

(75) Inventors: Brent Bouws, Holland, MI (US);
Warren E. Guthrie, West Olive, MI (US); Pat Burel, Holland, MI (US); Kurt Dykema, Holland, MI (US)

(73) Assignee: Twisthink, L.L.C., Holland, MI (US)

( * ) Notice: Subject to any disclaimer, the term of this patent is extended or adjusted under 35 U.S.C. 154(b) by 311 days.

(21) Appl. No.: 13/017,489

(22) Filed: Jan. 31, 2011

(65) Prior Publication Data

US 2011/0187271 A1 Aug. 4, 2011

Related U.S. Application Data (60) Provisional application No. 61/337,154, filed on Feb. 1, 2010.

(51) Int. Cl.
| H05B 37/02 | (2006.01) |
| H05B 37/00 | (2006.01) |
| H05B 41/36 | (2006.01) |
| H05B 37/03 | (2006.01) |
| H05B 41/285 | (2006.01) |
| H05B 37/04 | (2006.01) |
| H05B 33/08 | (2006.01) |

(52) U.S. Cl.
CPC ........... *H05B 37/00* (2013.01); *H05B 41/36* (2013.01); *H05B 37/03* (2013.01); *H05B 41/285* (2013.01); *H05B 33/0815* (2013.01); *H05B 37/0245* (2013.01); *H05B 37/02* (2013.01); *H05B 37/04* (2013.01)
USPC .............................. 315/294; 315/152; 315/312

(58) Field of Classification Search
CPC .............. H05B 33/0815; H05B 37/02; H05B 37/0245; H05B 37/03; H05B 41/285; H05B 41/36
USPC ......... 315/130, 291, 294, 307, 308, 312, 324, 315/360
See application file for complete search history.

(56) References Cited

U.S. PATENT DOCUMENTS

| 4,810,936 A | 3/1989 | Nuckolls et al. |
| 5,315,214 A | 5/1994 | Lesea |
| 5,357,170 A | 10/1994 | Luchaco et al. |
| 5,471,119 A * | 11/1995 | Ranganath et al. ........... 315/307 |
| 5,777,439 A | 7/1998 | Hua |
| 5,883,473 A | 3/1999 | Li et al. |
| 5,925,990 A | 7/1999 | Crouse et al. |

(Continued)

FOREIGN PATENT DOCUMENTS

| EP | 0582287 | 2/1994 |
| WO | 2008021120 | 2/2008 |

*Primary Examiner* — Tung X Le
(74) *Attorney, Agent, or Firm* — Warner Norcross & Judd LLP (57) ABSTRACT

A system and method for detecting light fixture failure and for enhancing energy efficient operation of multiple light fixtures. The system includes multiple light control modules and a gateway. The light control modules alert the gateway of a bulb or ballast failure based on light fixture power consumption. The light control module can indicate a sudden failure, a slow failure, a striating failure, a stuck relay failure and a start-up failure. The light control modules can include a photo-sensor and an occupancy sensor for measuring brightness and occupancy, respectively, in the vicinity of one or more light fixtures. The gateway can distribute operating instructions to the light control modules based on changes in the ambient temperature and based on the power consumption of nearby light fixtures.

23 Claims, 9 Drawing Sheets

(56) References Cited

U.S. PATENT DOCUMENTS

| | | |
|---|---|---|
| 5,943,181 A | 8/1999 | Son et al. |
| 5,962,989 A | 10/1999 | Baker |
| 5,971,597 A | 10/1999 | Baldwin et al. |
| 6,175,189 B1 | 1/2001 | Brooks |
| 6,181,086 B1 | 1/2001 | Katyl et al. |
| 6,222,322 B1 | 4/2001 | Stack |
| 6,370,489 B1 | 4/2002 | Williams et al. |
| 6,388,396 B1 | 5/2002 | Katyl et al. |
| 6,396,216 B1 | 5/2002 | Noone et al. |
| 6,545,432 B2 | 4/2003 | Konopka |
| 6,608,453 B2 * | 8/2003 | Morgan et al. ............... 315/312 |
| 6,664,790 B2 | 12/2003 | Cook et al. |
| 6,956,336 B2 | 10/2005 | Ribarich |
| 7,154,232 B2 | 12/2006 | Contenti et al. |
| 7,327,101 B1 | 2/2008 | Chen et al. |
| 7,603,184 B2 | 10/2009 | Walters et al. |
| 2004/0002792 A1 | 1/2004 | Hoffknecht |
| 2005/0231125 A1 * | 10/2005 | Becattini ...................... 315/195 |
| 2008/0265799 A1 * | 10/2008 | Sibert ........................... 315/292 |
| 2009/0102398 A1 * | 4/2009 | Becattini et al. .............. 315/294 |
| 2009/0121640 A1 | 5/2009 | Ootsuka et al. |
| 2009/0198384 A1 * | 8/2009 | Ahn .............................. 700/292 |
| 2012/0013257 A1 * | 1/2012 | Sibert ........................... 315/152 |
| 2012/0043889 A1 * | 2/2012 | Recker et al. .................. 315/86 |

* cited by examiner

LUMINARY CONTROL SYSTEMS

BACKGROUND OF THE INVENTION

The present invention relates to luminary control systems and methods. More particularly, the present invention relates to failure detection systems and energy management systems for multiple luminaries.

Artificial lighting has long been commonplace in commercial, industrial and other spaces. To maximize the application of artificial light, light fixtures are typically dispersed throughout such spaces. Inevitably, however, light fixtures fail. For example, light fixtures can fail due to a faulty ballast, a shattered bulb, or an incorrect mains voltage. In addition, light fixtures can striate as they age, causing the lamp to flicker on and off. Because light fixtures are often the only source of artificial lighting, it can be important to quickly and efficiently detect and diagnose a light fixture failure.

Currently, light fixture failures often are identified through periodic manual inspection of each individual bulb and ballast. This can include the time consuming tasks of identifying the location of the failure (e.g., bulb or ballast) and identifying the cause of the failure (e.g., manufacturing defect or faulty installation). Not surprisingly, manual inspections are costly, as they require extensive time and proper training. If the inspection occurs during daylight hours, the cost of an inspection can increase to account for the electrical power needed to activate each light fixture.

A number of systems have recently been offered as an alternative to manual inspections. One such system includes a peripheral unit affixed to each light fixture in an outdoor lighting system. The peripheral unit includes a visible signaling device, such as a flag or a flashing beacon, to indicate a potential fault is detected. Another such system includes a building control unit to monitor and control lighting parameters. The building control unit sends operating parameters, by remote link, to each peripheral unit associated with a ballast. The peripheral unit compares the actual operating parameters with the received operating parameters, and alerts the building control unit of a divergence by wireless link.

Despite their advantages over manual methods of inspection, the above systems have not gained widespread acceptance. Accordingly, there remains a continued need for an improved system and method for evaluating multiple lighting fixtures for faults. In addition, there remains a continued need for an improved system and method for maximizing the efficient use of multiple lighting fixtures dispersed throughout a commercial, industrial or public space.

SUMMARY OF THE INVENTION

The present invention provides systems and methods for detecting light fixture failure and for enhancing energy efficient operation of a network of light fixtures.

In one embodiment, a system for detecting light fixture failure includes a light control module and a gateway. The light control module is adapted to measure the power consumption of the light fixture. The gateway is adapted to receive a failure message from the light control module based on the measured power consumption. The failure message can indicate a sudden failure, a slow failure, a striating failure, a stuck relay failure and a start-up failure.

In another embodiment, a method is provided for detecting light fixture failure. The method includes measuring the current and the voltage between the light fixture and a mains supply, determining a power value proportional to the product of the measured current and the measured voltage, and comparing the power value to a reference value. The reference value can include an average of multiple prior ballast power values or a percentage of a prior ballast power value.

In another embodiment, a system is provided for monitoring two or more light fixtures. The system includes a plurality of light control modules and a gateway. The light control modules each include a photo-sensor for measuring a brightness level in the vicinity of a light fixture. The gateway is adapted to distribute operating instructions to the light control modules based on a comparison of an average measured brightness level with a predetermined reference value. The operating instructions can include changing from a first operating state to a second operating state in response to the average brightness level being less than the reference value.

In another embodiment, a method is provided for controlling light fixture output. The method includes measuring the brightness level in the vicinity of two or more light fixtures, averaging the measured brightness levels, comparing the average with a predetermined baseline, and distributing operating instructions to the light control modules. The operating instructions include increasing light fixture output in response to the average brightness level being less than a first value and decreasing light fixture output in response to the average brightness level being greater than a second value.

In another embodiment, a system is provided for managing multiple light fixtures between a first state and a second state. The system includes multiple light control modules and a gateway. The light control modules can each include an occupancy sensor for determining occupancy in the vicinity of a light fixture. The gateway is adapted to distribute a first operating instruction to the light control modules in response to detecting a sufficient number of occupancies within a given period of time. The first operating instruction can include changing from a first state to a second state. The gateway is further adapted to distribute a second operating instruction in response to detecting less than a sufficient number of occupancies within a given period. The second operating instruction can include reverting to the first state.

In another embodiment, a method is provided for controlling light fixture output. The method includes measuring the occupancy in the vicinity of two or more light control modules and distributing a first operating instruction to the light control modules after detecting a sufficient number of occupancies within a first period. The first operating instruction includes increasing the light fixture output. The method can also include distributing a second operating instruction to the light control modules after detecting less than a sufficient number of occupancies after a second period has lapsed. The second operating instruction includes decreasing the light fixture output.

Accordingly, the present invention provides low-cost systems and methods for managing light output across multiple light fixtures. In addition, the present invention detects light fixture failure across a range of environmental conditions. A website provides facility administrators with the status, the operating state and the location of each fixture, thereby simplifying the management and maintenance of a network of light fixtures distributed throughout a commercial, industrial or other space.

These and other features and advantages of the present invention will be more fully understood and appreciated in view of the description of the current embodiments, the drawings, and the appended claims.

DETAILED DESCRIPTION OF THE CURRENT EMBODIMENT

The embodiments of the present invention provide systems and methods for detecting light fixture failure and for enhancing energy efficient operation of a network of light fixtures located throughout a commercial, industrial or other space.

I. Bulb and Ballast Failure Detection

According to one embodiment, a light control system includes multiple Light Control Modules (LCMs) and a Gateway. Each LCM can detect a light fixture failure based on a change in light fixture power consumption. Once detected, the failure is communicated to the Gateway across a wireless network. The Gateway, in turn, communicates the light fixture failure to a remote computer terminal with sufficient data to alert personnel to the location of the light fixture and the nature of the failure. The Gateway can be connected to the remote computer using an internet connection. Optionally, the remote computer can belong to the operator of the commercial, industrial or other space.

Figure 1:
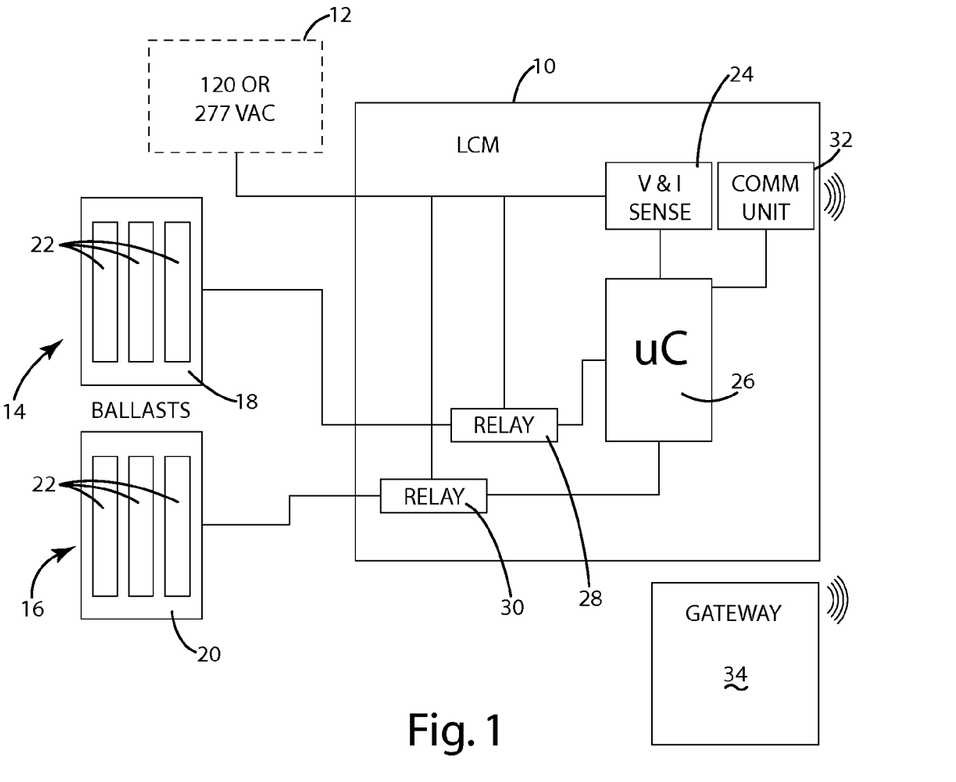
FIG. 1 is an illustration of a Light Control Module in accordance with an embodiment of the invention.

Referring to FIG. 1, one example of an LCM is illustrated and generally designated 10. The LCM is electrically connected between a mains supply 12 and first and second light fixtures 14, 16. The mains supply 12 can provide a 120 VAC operating voltage, a 277 VAC operating voltage, or other suitable operating voltage. Each light fixture 14, 16 can include a ballast 18, 20 and one or more bulbs 22. The ballasts 18, 20 can include any suitable ballast to provide a regulated output to a bulb. For example, the ballasts 18, 20 can include the GE-232-MP-PS-H ballast by General Electric, the QTP3x32T8/UNV ISH-SC ballast by Sylvania, or the QTP2x54T5HO ballast by Sylvania. The bulbs 22 can include any compatible luminary, including linear fluorescent lamps, metal halide lamps, and high pressure sodium lamps. The Gateway 34 is connected to the LCM across a wireless network. The wireless network can include a ZigBee architecture, though other wireless protocols can also be utilized.

As also shown in FIG. 1, the LCM 10 includes a power measurement circuit 24, a microcontroller 26, first and second microcontroller-controlled relays 28, 30, and a communications unit 32 contained within an LCM housing. The power measurement circuit 24 is electrically connected to the operating voltage and operating current, and provides first and second analog outputs proportional to the operating voltage and the operating current, respectively. Should one or more ballasts fail, the resulting drop in power consumption is reflected as a reduced operating current. The microcontroller 26 is electrically connected to the power measurement circuit 24 and includes an analog to digital converter (ADC) to convert the first and second analog outputs into first and second digital signals. At predetermined (e.g., one minute) intervals, the microcontroller 26 samples the digital signals, optionally at a 10 kHz sampling rate. Using a digital filter, the microcontroller isolates the peak operating voltage and the peak operating current at each interval. These peak voltage and current values are multiplied together to derive a power consumption value. This power consumption value is stored in microcontroller non-volatile memory in a multi-element first-in-first-out buffer array. The non-volatile memory can include a buffer array for each light fixture operational state (e.g., low, medium and high). The power consumption values form a power consumption history or rolling baseline from which to compare successive power values. Using the power consumption history, the LCM microcontroller 26 can detect and distinguish among a number of failures, including a sudden failure, a slow failure, a striating failure, a stuck relay failure, and a start-up failure, for example. The failure, once detected, can be communicated to the Gateway 34 using the communications unit 32. The communications unit 32 can include an RF antenna and encryption unit for transmitting and receiving data from the Gateway 34.

A. Sudden Failure

Figure 2:
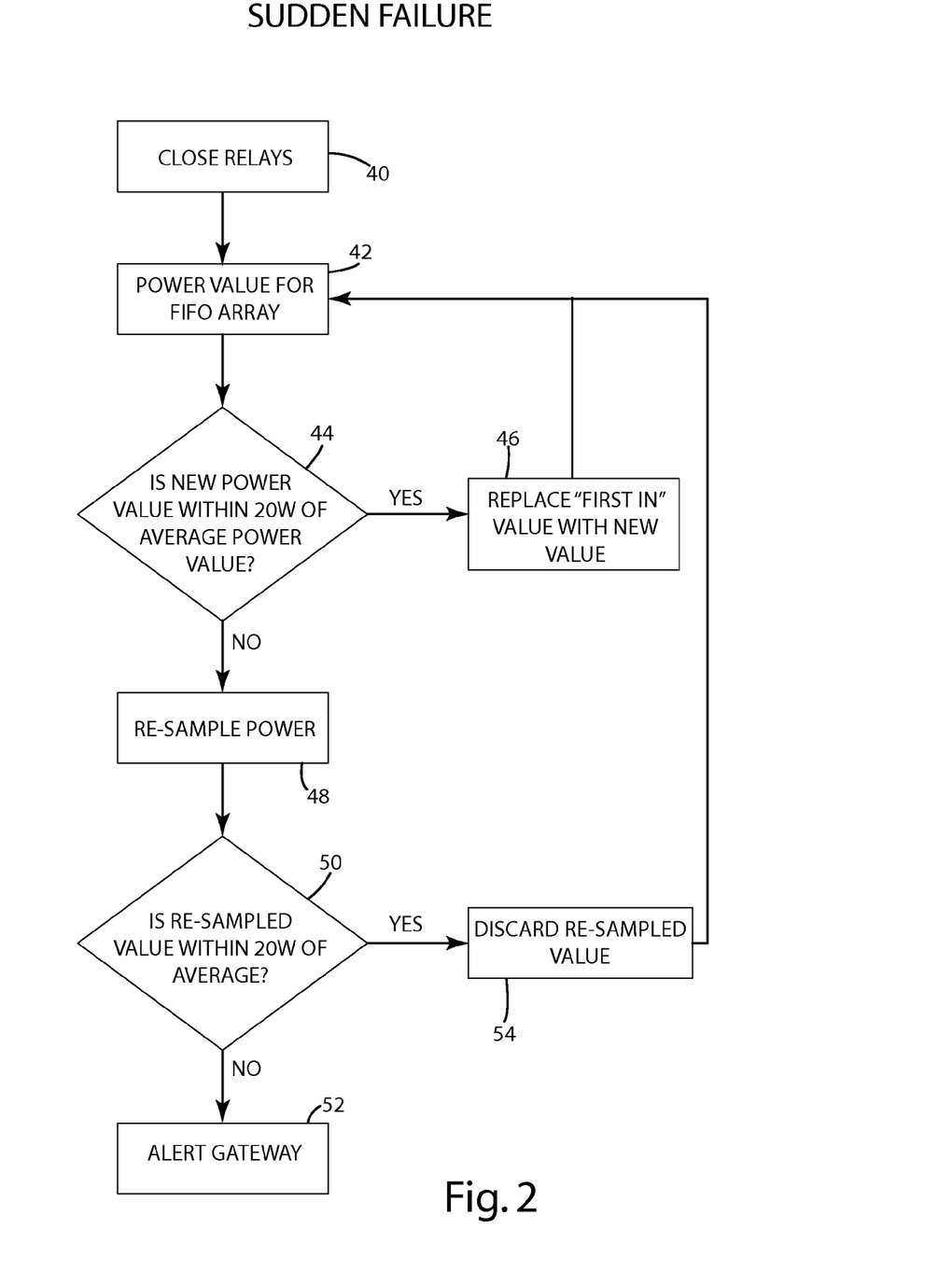
FIG. 2 is a flow chart illustrating a method for detecting a Sudden Failure in accordance with an embodiment of the invention.

Operation of the LCM of FIG. 1 to detect a sudden bulb or ballast failure can be understood with reference to the flow chart FIG. 2. At step 40, the first and second relays 28, 30 are closed, forming a conducting path from the mains supply 12 through the LCM 10 to the first and second ballasts 18, 20. At step 42, optionally fifteen minutes after activation of the relays, the microcontroller populates the first-in-first-out buffer array with successive one-minute power consumption values substantially as set forth in the manner described above. At step 44, the LCM compares a new power consumption value to the average of the power consumption values contained in the buffer array. If the new power consumption value differs from the average by less than a threshold value (e.g., 20 W), the microcontroller replaces the "first-in" power value with the new power value at step 46, and continues the process at step 42. If, however, the new power value differs from the average by greater than the threshold value, the LCM discards this value and immediately resamples the ballast power consumption at step 48. If at step 50 the re-sampled consumption power value differs from the buffer array average by less than the threshold value, then the re-sampled value is also discarded, and the process resumes at step 42. If however the re-sampled power consumption value differs from the average by greater than the threshold value, the communications unit 32 sends an alert to the Gateway. While noted as having a 20 W threshold, the threshold value can be any suitable value, typically large enough to distinguish bulb and ballast failure from minor variations in light fixture power consumption.

B. Slow Failure

A slow failure can occur where a ballast draws less current over time. This is commonly caused by the failure of one or more ballast input capacitors. In order to detect a slow failure, a method is provided in connection with the flow diagram of FIG. 3. The method generally includes comparing a power consumption value with a baseline power consumption average. For example, the method can include sampling the ballast power consumption within hours of ballast installation over successive intervals, averaging the initial power consumption values to determine a baseline power consumption, and comparing later power consumption values with the baseline power consumption. If a later power consumption value differs from the baseline power consumption by greater than a predetermined percentage, the LCM communications unit can transmit a slow failure alert to the Gateway. In addition, the Gateway can transmit a reset baseline command to the LCM to reset the baseline power consumption when the ballast is replaced.

Figure 3:
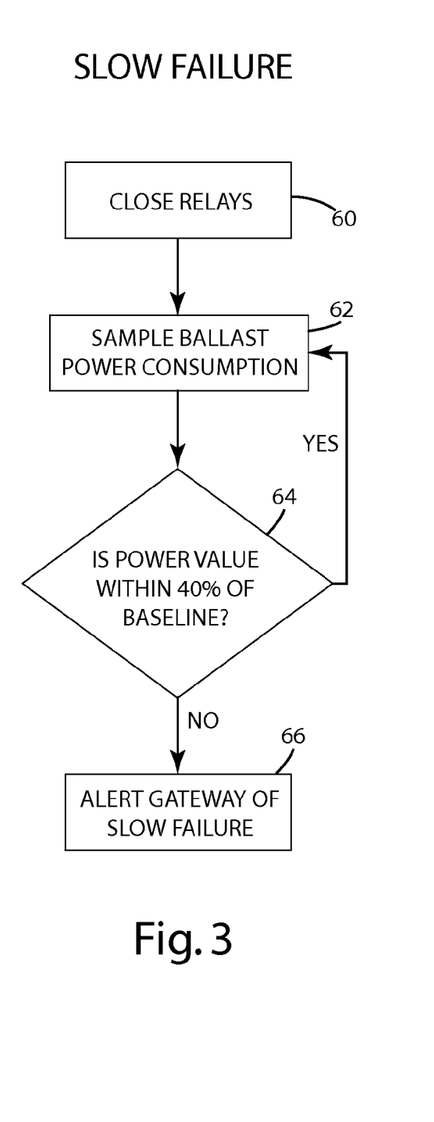
FIG. 3 is a flow chart illustrating a method for detecting a Slow Failure in accordance with an embodiment of the invention.

More particularly, and with reference to FIG. 3, the method for detecting a slow failure can include closing the first and second relays at step 60 to form a conducting path from the mains supply through the LCM to the first and second ballasts. At step 62, optionally fifteen minutes after activation of the relays, the LCM again samples the ballast power consumption. At step 64, the LCM compares the new power consumption value against the baseline power consumption average for the applicable operating state. If the power consumption value is within a predetermined percentage (e.g., 40%) of the base power consumption, the LCM returns to step 62 and samples the ballast power consumption at the next scheduled interval. If however the power consumption value differs from the baseline power consumption by greater than the predetermined percentage value, the LCM communications unit can transmit a slow failure alert to the Gateway at step 66.

C. Striating Failure

A striating ballast can cause a bulb to cycle on and off at a high rate of speed, often appearing as a flickering or pink bulb. In this condition, the ballast is continually attempting to start the one or more bulbs. As a result, the ballast power consumption can vary wildly. In order to detect a striating ballast, a method is provided in which the LCM determines if the standard deviation of multiple power consumption values is within acceptable limits.

Figure 4:
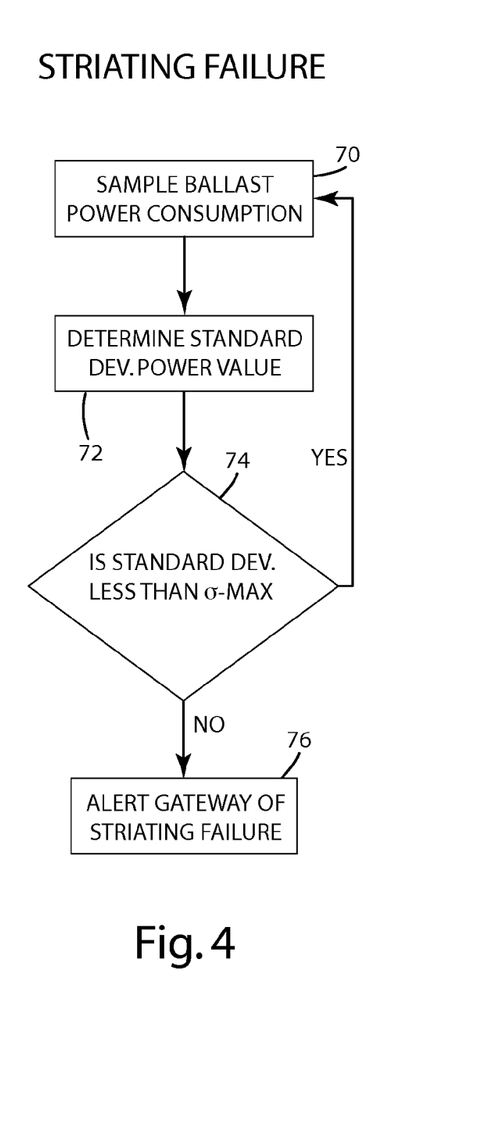
FIG. 4 is a flow chart illustrating a method for detecting a Striating Failure in accordance with an embodiment of the invention.

More particularly, with reference to FIG. 4, a method for detecting striating failure can include populating a first-in-first-out buffer array with successive power consumption values at step 70. For example, the microcontroller can populate a four element buffer array with successive power consumption values at one minute intervals. Using these power consumption values, the LCM determines a standard deviation at step 72. At step 74, the LCM determines if the standard deviation is less than a predetermined maximum standard deviation (σ-max). If at step 74 the standard deviation is less than σ-max, the LCM returns to step 70 and samples the ballast power consumption at the next scheduled interval. If however the standard deviation is greater than σ-max, the LCM communications unit can transmit a striating failure alert to the Gateway at step 76.

D. Stuck Relay

During normal operation, the first and second relays 28, 30 transition between the open and closed position to control the flow of electrical power to the first and second ballasts 18, 20. In addition, the first and second ballasts vary among power states using one or more additional microcontroller-controlled relays (not shown). A stuck relay can cause the ballasts to draw more or less current than desired. For example, a stuck relay can cause a light fixture to operate during daylight hours. In other instances, a stuck relay can cause a light fixture to provide insufficient illumination.

Figure 5:
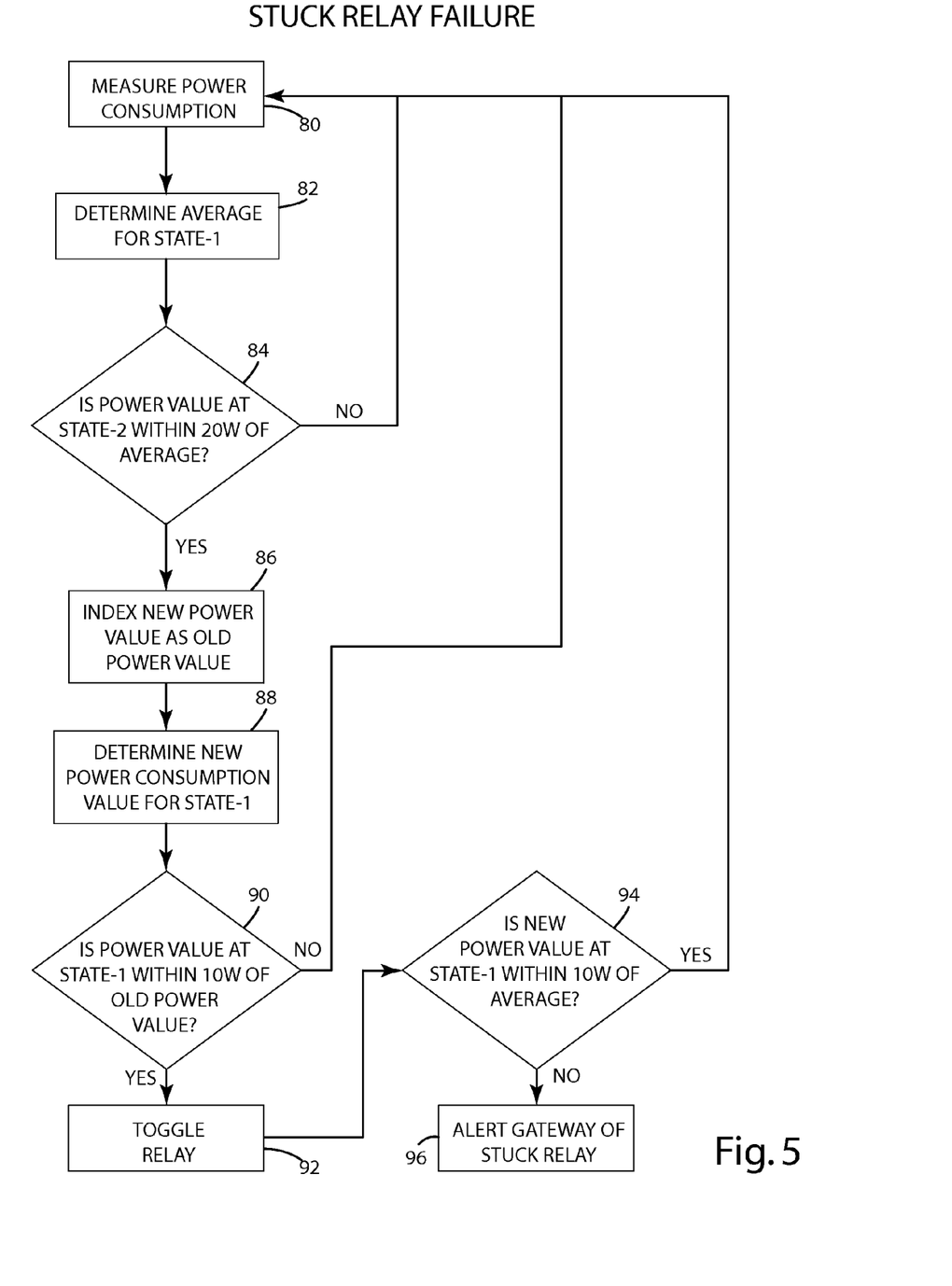
FIG. 5 is a flow chart illustrating a method for detecting a Stuck Relay in accordance with an embodiment of the invention.

In order to detect a stuck relay, a method is provided in which the LCM determines if the ballast power consumption is sufficiently different shortly after activating one or more relays. More particularly, with reference to FIG. 5, a method for detecting a stuck relay can include populating a first-in-first-out buffer array with successive power consumption values at step 80. For example, the microcontroller can populate a four element buffer array with successive power consumption values at one minute intervals. Using these power consumption values, the LCM determines an average power consumption value at step 82. This power consumption average is indexed in memory with the appropriate operating state (e.g., low, medium and high). At step 84, after attempted activation of a relay, the LCM determines if a new power consumption value is within a first predetermined range (e.g., +/– 20 W) of the previously saved average power consumption. If the new power consumption value is outside 20 W of the saved average, then the relay is determined to function properly. However, if the new power consumption value is within 20 W of the saved average, then the new power value is indexed in memory as an old power consumption value at step 86. At step 88, the LCM attempts to return the relay to the prior state and determines a new power consumption value. If at step 90 the new power consumption value is outside a second predetermined range (e.g., +/– 10 W) of the old power value, then the relays are determined to function properly. However, if at step 90 the new power value is within 10 W of the old power value, a stuck relay condition is declared. At step 92, the relay is toggled between its previous state and its current state, ending up in the current state. At step 94, the LCM compares a new power level with the average power consumption level of step 82. If the new power consumption level is within 10 W of the average power consumption level for that state, the relay is declared to be functional or unstuck. If, however, the new power consumption value is outside of 10 W of the average power consumption level for that state, the relay is declared to be stuck, and the LCM transmits a stuck relay fault to the Gateway.

E. Start-Up Failure

Figure 6:
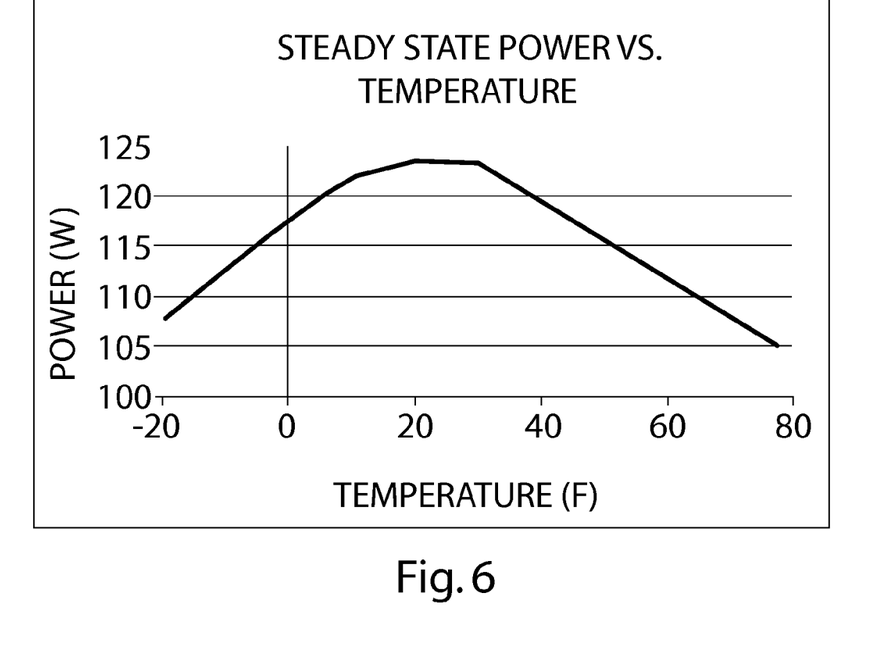
FIG. 6 is a graph illustrating ballast power consumption as a function of ambient temperature.
Figure 7:
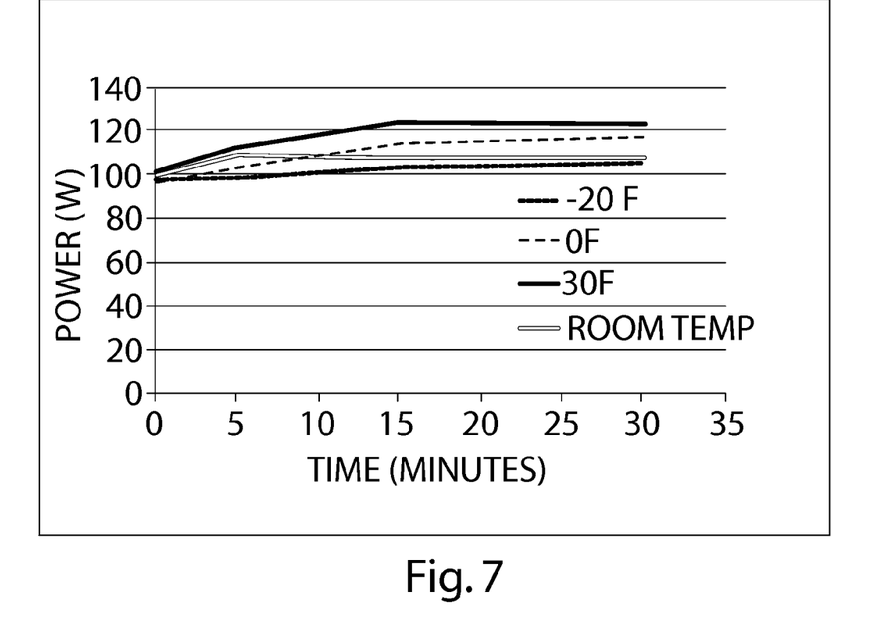
FIG. 7 is a graph illustrating ballast power consumption as a function of time.

In some instances, ballast power consumption will be unexpectedly less than anticipated when the light fixture is first activated. One solution for detecting a start-up failure can include comparing a new power consumption value with a stored power consumption value from the previous activation. However, the ballast power consumption can vary widely despite the normal operation of each ballast. For example, a ballast will typically draw different amounts of power upon start-up than it does after it has "warmed up". A graph illustrating this change is shown in FIG. 6, in which the power consumption increases as the temperature of the bulbs increase before declining after warming past 30° F. In addition, variations in the ambient temperature will also affect start-up power consumption. A graph illustrating power consumption as a function of ambient temperature is shown in FIG. 7. For an ambient temperature of −20° F., for example, the power consumption for two ballasts increases gradually from 100 W to approximately 105 W over a period of thirty minutes. For an ambient temperature of 30° F., however, the power consumption for two ballasts increases from 100 W to 110 W in five minutes, achieving a steady state power consumption of 124 W after only 15 minutes. The start-up power consumption can also vary as a function of the number of activated ballasts. For example, the power consumption will likely be different if the light fixture activates two ballasts from no ballasts than if the light fixture activates two ballast from one ballast being on.

In order to accurately detect a start-up failure, a method is provided in which the LCM determines if the ballast power consumption is within acceptable limits with reference to a look-up table stored in memory. More particularly, with reference to FIG. 8, a method for detecting start-up failure can include sampling the power consumption shortly after activating the light fixture at step 100. At step 102, the LCM recalls from memory a baseline power consumption value for start-up at the given operating state. At step 104, the LCM determines if the power consumption value from step 100 is within a first predetermined range (e.g., +/− 15 W) of the baseline power consumption for start-up. If the new power consumption value is within 15 W of the baseline value, then the light fixture is determined to function properly. However, if the new power consumption value is not within 15 W of the baseline power consumption, then the LCM transmits the faulty power consumption value to the Gateway at step 108.

Figure 8:
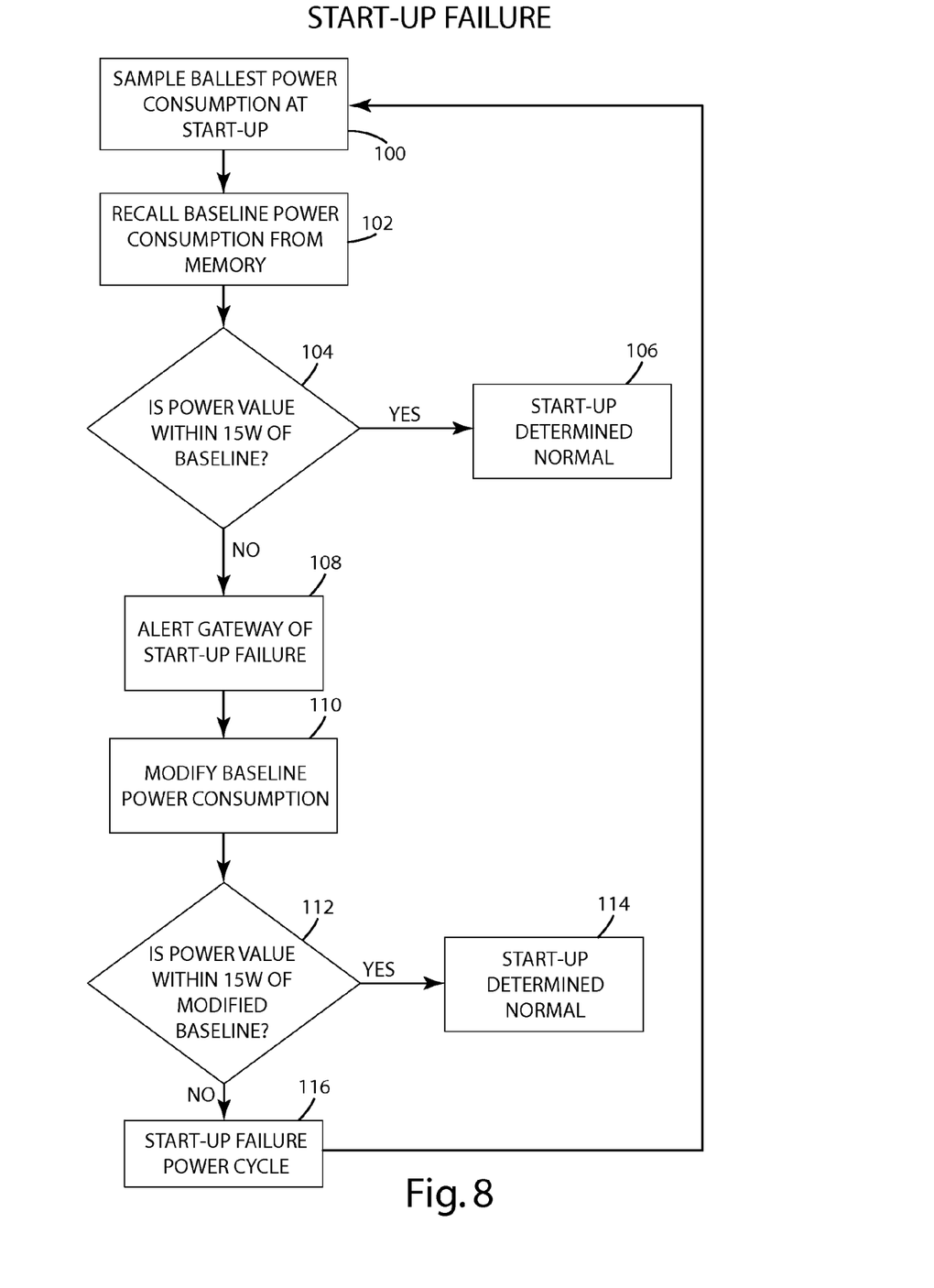
FIG. 8 is a flow chart illustrating a method for detecting a Start-Up Failure in accordance with an embodiment of the invention.

Optionally, the Gateway can attempt corrective action, such as a light fixture power cycle. In addition, the Gateway can make a final determination by comparing the power consumption value to a modified baseline value. For example, the modified baseline value can be corrected for variations in ambient temperature. In addition, the modified baseline value can be corrected by comparison with the power consumption of nearby light fixtures in the same operating state. The modified baseline value can be further adjusted if a comparison of start-up values is made with a second fixture having the same operating history. For example, the Gateway can control multiple nodes in the same manner by turning on and off each associated light fixture at the same time and in the same environment. After the baseline value has been modified, the Gateway determines if the power consumption value is within 15 W of the modified value for start-up at step 112. If the measured power consumption value is within 15 W of the baseline value, then the light fixture is determined to function properly at step 114. However, if the measured power consumption value is not within 15 W of the modified baseline power consumption, then the Gateway determines a start-up failure has occurred at step 116.

Though described above as detecting a failure based on ballast power consumption, the LCM 10 can detect and distinguish among the above failures based on the emitted light of the associated light fixture. For example, the LCM can include multiple light sensors positioned to measure illumination from each bulb by locating each light sensor so that the received illumination is substantially from the bulbs, and not from the ambient environment. Alternatively, the LCM can include one light sensor that is positioned to measure illumination from all bulbs in the light fixture. A light guide or light pipe can also be utilized to direct light from the one or more bulbs to the light sensor element or elements. In this regard, the above methods for detecting a sudden failure, a slow failure, a striating failure, a stuck relay failure, and a start-up failure can be modified to include the light output in place of, or in addition to, the power consumption. In still another embodiment, the failure detection methods described above can be based on an indirect measurement of light fixture illumination. For example, the LCM can include a light sensor adapted to measure the light in the area intended for illumination (i.e., the reflected light). In this regard, the above methods for detecting a sudden failure, a slow failure, a striating failure, a stuck relay failure, and a start-up failure can be modified to include the reflected light in place of, or in addition to, the power consumption. The threshold for determining a light fixture failure can vary based on environmental conditions such as the sensor height above the floor and the distance to other light sources. Optionally, illumination levels can be compared among discrete regions to compensate for variations due to natural lighting and other light sources.

II. Light Harvesting and Occupancy Sensing

In another embodiment of the invention, a system and method is provided for enhancing energy efficient operation of a network of light fixtures located throughout a commercial, industrial or other space. The system and method can include providing a photo-sensor for each of a number of light fixtures, and controlling each light fixture output based on averaged ambient light levels. The system and method can also include providing an occupancy sensor for each of a number of light fixtures, and controlling light fixture output based on motion detection from multiple occupancy sensors. The system and method is uniquely adapted for use in a parking garage, but can be suitably adapted for any of a variety of commercial, industrial and other spaces.

Figure 9:
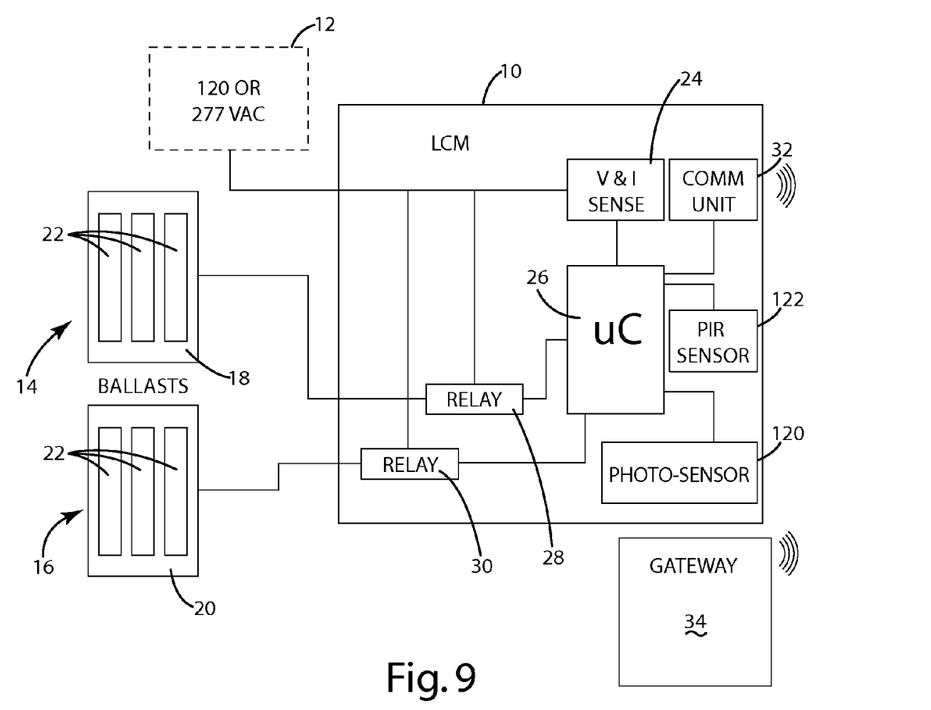
FIG. 9 is an illustration of a Light Control Module in accordance with another embodiment of the invention.

The light control system of the present embodiments includes a Gateway networked with multiple LCMs substantially as described above in connection with Part I. In particular, the Gateway and the multiple LCMs communicate across a ZigBee network. The LCMs monitor the power consumption and/or the light output of one or more corresponding light fixtures. Generally, each light fixture is optionally spaced 20 to 30 feet apart from the closest light fixture. In addition, each light fixture optionally includes a ballast and three bulbs. The bulbs can be activated in three different configurations or operational settings (e.g., low, medium and high) to vary the amount of emitted light. As shown in FIG. 9, the LCM 10 can include a photocell sensor circuit 120 for detecting local ambient light levels. The photocell circuit 120 provides an output signal based on the level of ambient light impinging an associated photo-sensor through a window in the LCM housing. The photocell circuit output is electrically coupled to the LCM microcontroller 26. In one embodiment, only five LCMs will include a photocell sensor circuit 120, while the remaining LCMs in the commercial, industrial or other space are substantially as described above.

Figure 10:
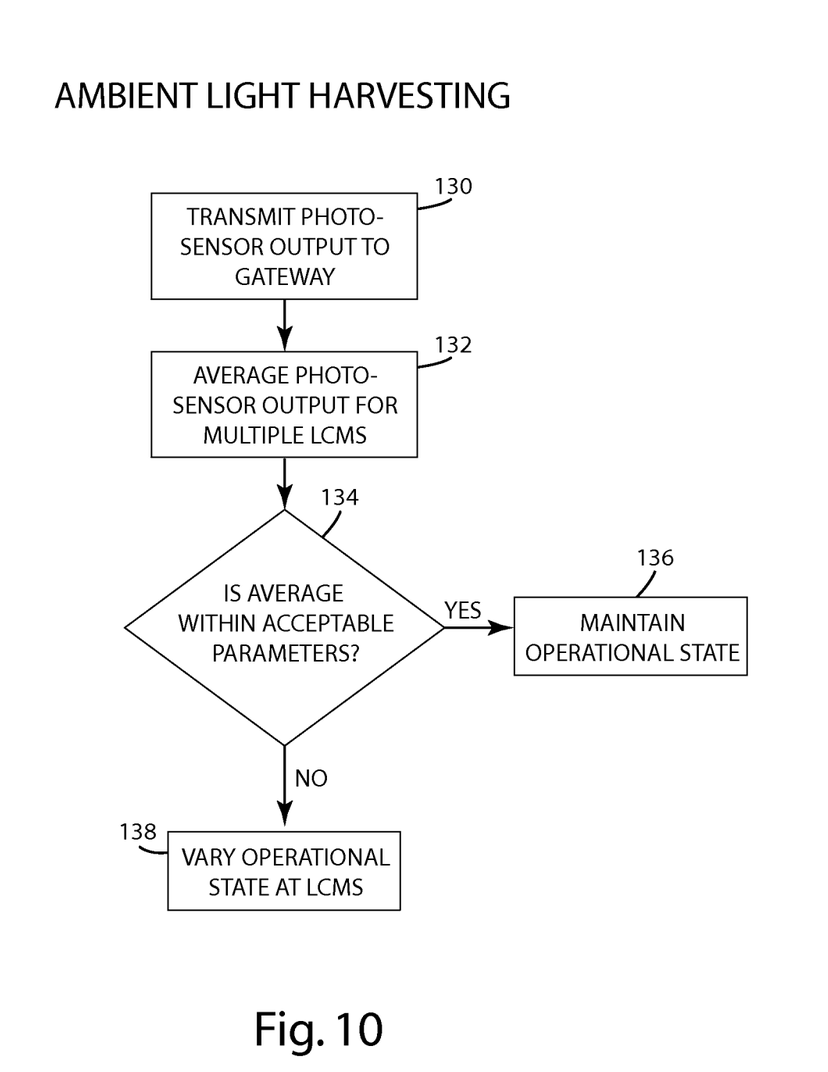
FIG. 10 is a flow chart illustrating a method for controlling the light output of multiple light fixtures based on ambient light levels.

In order to enhance energy efficient operation of two or more light fixtures, a method is provided in which the output of each of a plurality of photo-sensors is communicated to the Gateway, which then averages each photo-sensor output to determine if the host space is sufficiently illuminated. More particularly, with reference to FIG. 10, a method to enhance energy efficient operation of multiple light fixtures includes transmitting a photo-sensor output from multiple LCMs to the Gateway at time $t_1$ and at step 130. At step 132, the Gateway determines an average photo-sensor output. At step 134, the Gateway determines if the average photo-sensor output is within acceptable parameters for a given operational state based on luminescent values stored in memory. If the average photo-sensor output is within acceptable parameters, then the light fixtures are determined to function properly. However, if the average photo-sensor output is not within acceptable parameters, the Gateway alerts each LCM to adjust the light output at time $t_2$ and at step 138. This step can include increasing the light output, reducing the light output, opening the first and second microcontroller-controlled relays 28, 30, and/or closing the first and second microcontroller-controlled relays 28, 30. The method can continue at step 130, in which the photo-sensor output is again sampled and transmitted to the Gateway across the wireless network.

As also shown in FIG. 9, each LCM can optionally include an occupancy sensor circuit 122 whose output is electrically connected to the LCM microcontroller 26. The occupancy sensor circuit 122 can include an occupancy sensor such as a passive infra-red (PIR) motion sensor. The PIR motion sensor can be configured to sense infra-red radiation over a predetermined field of view. Generally, two or more light fixtures can start-up if occupancy is detected. For example, during off-peak hours the light fixtures can be off or in a low power state, and can activate or increase to a medium or high power state in response to a detected occupancy. Multiple LCMs can be controlled by the Gateway across a single node as a "sensor group". A sensor group can include multiple LCMs, multiple occupancy sensors, and multiple light fixtures. In one embodiment, for example, the sensor group can include ten LCMs, ten occupancy sensors, and twenty light fixtures. In some embodiments, each LCM housing can include a window for an internal occupancy sensor. In other embodiments, the occupancy sensors can be separate from each LCM and moveable with respect to the same. In this configuration, the occupancy sensors can be positioned "ahead" of the corresponding light fixtures in order to illuminate the relevant area just before someone or something enters the area serviced by the light fixtures.

A method for enhancing energy efficient operation of the sensor group light fixtures can include controlling light fixture output in response to motion detection from multiple occupancy sensors within the sensor group. More particularly, with reference to FIG. 11, a method to enhance energy efficient operation of multiple light fixtures includes transmitting a positive occupancy sensor output to the Gateway at step 140. As the phrase is used herein, a positive occupancy sensor output can indicate an occupancy sensor has detected an occupant (e.g., a vehicle or pedestrian) in the occupancy sensor field of view. At step 142, the Gateway determines if a minimum number of sensor group occupancy sensors has detected an occupant within a specified period of time. The minimum number of occupancy sensors is indexed in memory as the Event Activation Count (EAC). Optionally, the specified time period is fifteen minutes and the EAC is three. If the Gateway does not receive, from the corresponding LCMs, at least three occupancy alerts within the fifteen minute period, the LCMs for the given sensor group maintain their existing operating state at step 144. If, however, the Gateway receives three or more occupancy alerts from one or more sensor group LCMs within the fifteen minute period, the Gateway will instruct the sensor group LCMs to modify the illumination level accordingly. This can include closing the first and second relays 28, 30 and/or increasing the operating state from low to medium or high or from medium to high at step 146.

Figure 11:
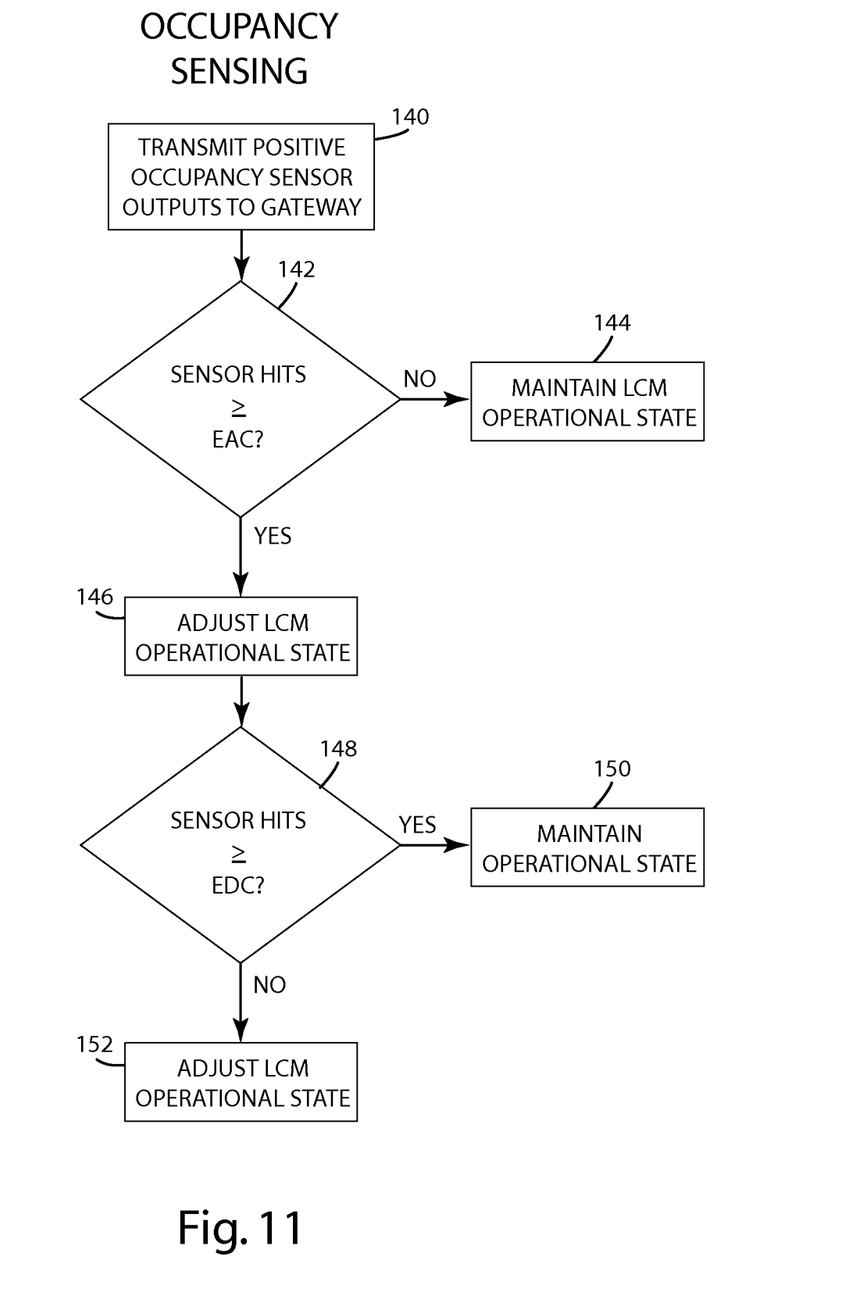
FIG. 11 is a flow chart illustrating a method for controlling the light output of multiple light fixtures based on occupancy sensor output.

At step 148, the Gateway again determines whether a minimum number of sensor group occupancy sensors has detected an occupant within a specified period of time. The minimum number of occupancy sensors is indexed in memory as the Event Deactivation Count (EDC). Optionally, the specified time period is fifteen minutes and the EAC is one. If the Gateway does not receive, from the corresponding LCMs, at least one occupancy alert within the fifteen minute period, the Gateway will instruct the sensor group LCMs to modify the illumination level accordingly. This can include opening the first and second relays 28, 30 and/or decreasing the operating state from high to medium or low or from medium to low at step 150. If, however, the Gateway does receive, from the sensor group LCMs, at least one occupancy alert within the fifteen minute period since the prior detected occupancy, the sensor group light fixture operational state will remain unchanged. In this regard, the ballasts are not receiving excess power in the absence of a vehicle or pedestrian in the area serviced by the sensor zone light fixtures.

The above description is that of current embodiment of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A system for monitoring a plurality of light fixtures, comprising:
   a light control module associated with each of the plurality of light fixtures, the light control module being adapted to determine a power failure based on the power consumption of the plurality of light fixtures and being further adapted to transmit a corresponding power failure message, wherein the light control module includes:
   a current and voltage sensing circuit to measure a current and a voltage provided to the plurality of light fixtures, and
   a microcontroller to determine a power consumption value based on the measured current and the measured voltage; and
   a gateway adapted to receive the power failure message from the light control module and adapted to generate an output based on the received power failure message, wherein the failure message is in response to the power consumption value being less than an average of a plurality of prior power consumption values to indicate a sudden failure.

2. A system for monitoring a plurality of light fixtures, comprising:
   a light control module associated with each of the plurality of light fixtures, the light control module being adapted to determine a power failure based on the power consumption of the plurality of light fixtures and being further adapted to transmit a corresponding power failure message, wherein the light control module includes:
   a current and voltage sensing circuit to measure a current and a voltage provided to the plurality of light fixtures, and
   a microcontroller to determine a power consumption value based on the measured current and the measured voltage; and
   a gateway adapted to receive the power failure message from the light control module and adapted to generate an output based on the received power failure message, wherein the failure message is in response to the power consumption value being less than a predetermined percentage of a prior power consumption value to indicate a slow failure.

3. A system for monitoring a plurality of light fixtures, comprising:
   a light control module associated with each of the plurality of light fixtures, the light control module being adapted to determine a power failure based on the power consumption of the plurality of light fixtures and being further adapted to transmit a corresponding power failure message, wherein the light control module includes:
   a current and voltage sensing circuit to measure a current and a voltage provided to the plurality of light fixtures, and
   a microcontroller to determine a power consumption value based on the measured current and the measured voltage; and
   a gateway adapted to receive the power failure message from the light control module and adapted to generate an output based on the received power failure message, wherein:

the microcontroller is operable to determine a standard deviation over multiple power consumption values; and the failure message is in response to the standard deviation being greater than a threshold standard deviation to indicate a striating failure.

4. A system for monitoring a plurality of light fixtures, comprising:

a light control module associated with each of the plurality of light fixtures, the light control module being adapted to determine a power failure based on the power consumption of the plurality of light fixtures and being further adapted to transmit a corresponding power failure message, wherein the light control module includes:
  a current and voltage sensing circuit to measure a current and a voltage provided to the plurality of light fixtures, and
  a microcontroller to determine a power consumption value based on the measured current and the measured voltage; and
a gateway adapted to receive the power failure message from the light control module and adapted to generate an output based on the received power failure message, wherein the failure message is in response to the power consumption value being within a range of a previous power consumption value after a change in operational state to indicate a stuck relay failure.

5. A system for monitoring a plurality of light fixtures, comprising:

a light control module associated with each of the plurality of light fixtures, the light control module being adapted to determine a power failure based on the power consumption of the plurality of light fixtures and being further adapted to transmit a corresponding power failure message, wherein the light control module includes:
  a current and voltage sensing circuit to measure a current and a voltage provided to the plurality of light fixtures, and
  a microcontroller to determine a power consumption value based on the measured current and the measured voltage; and
a gateway adapted to receive the power failure message from the light control module and adapted to generate an output based on the received power failure message, wherein the failure message is in response to the power consumption value being outside a range of a baseline value upon light fixture start-up.

6. A light monitoring system for a plurality of light fixtures operable between a first state and a second state, comprising:

a plurality of light control modules each including a photosensor for detecting a brightness level in the vicinity of an associated light fixture, the plurality of light control modules adapted to generated an output based on the detected brightness level;
a gateway adapted to receive the output from the plurality of light control modules and including a controller to determine an average based on each received output, wherein the gateway transmits an operating instruction based on a comparison of the average with a predetermined reference value.

7. The light monitoring system of claim 6 wherein the operating instruction includes changing from the first operating state to the second operating state in response to the average of each received output being less than the reference value.

8. The light monitoring system of claim 6 wherein each of the plurality of light control modules is connected between a mains supply and a separate one of the plurality of light fixtures.

9. The light monitoring system of claim 6 wherein each of the plurality of light control modules is adapted to measure the power consumption of a separate one of the plurality of light fixtures to determine a light fixture failure.

10. The light monitoring system of claim 6 wherein each of the plurality of light control modules includes an occupancy sensor for determining an occupancy event in the vicinity of an associated light control module.

11. The light monitoring system of claim 10 wherein the gateway is adapted to distribute operating instructions to the plurality of light control modules in response to a minimal number of detected occupancy events within a predetermined period of time.

12. A light monitoring system for a plurality of light fixtures operable between a first state and a second state, comprising:

a plurality of light control modules each including an occupancy sensor for detecting an occupancy event in the vicinity of an associated light fixture, the plurality of light control modules adapted to generated an output based on the occupancy event;
a gateway adapted to receive the output from the plurality of light control modules and adapted to determine the number of occupancy events within a first predetermined period of time, wherein the gateway distributes a first operating instruction to the plurality of light control modules in response to greater than a first number of occupancy events being detected within the first predetermined period of time.

13. The light monitoring system of claim 12 wherein the first operating instruction includes changing from the first state to the second state.

14. The light monitoring system of claim 13 wherein the gateway is further adapted to distribute a second operating instruction to the plurality of light control modules in response to less than a second number of occupancy events being detected within a second predetermined period of time.

15. The light monitoring system of claim 14 wherein the second operating instruction includes changing from the second state to the first state.

16. The light monitoring system of claim 12 wherein each of the plurality of light control modules is adapted to measure the power consumption of a separate one of the plurality of light fixtures to determine a light fixture failure.

17. The light monitoring system of claim 12 wherein each of the plurality of light control modules includes a photosensor for measuring a brightness level in the vicinity of an associated light control module.

18. The light monitoring system of claim 12 wherein each of the plurality of light control modules is connected between a mains supply and a separate one of the plurality of light fixtures.

19. A system comprising:

a light fixture including a plurality of luminaries;
a light control module associated with the light fixture, the light control module being adapted to determine a power failure based on the power consumption of the light fixture and being further adapted to transmit a corresponding power failure message, wherein the light control module includes:
  a current and voltage sensing circuit to measure a current and a voltage provided to the light fixture, and a microcontroller to determine a power consumption value based on the measured current and the measured voltage; and a gateway adapted to receive the power failure message from the light control module and adapted to generate an output based on the received power failure message, wherein the failure message is in response to the power consumption value being less than an average of a plurality of prior power consumption values to indicate a sudden failure.

20. A system comprising:

a light fixture including a plurality of luminaries;

a light control module associated with the light fixture, the light control module being adapted to determine a power failure based on the power consumption of the light fixture and being further adapted to transmit a corresponding power failure message, wherein the light control module includes:

a current and voltage sensing circuit to measure a current and a voltage provided to the light fixture, and a microcontroller to determine a power consumption value based on the measured current and the measured voltage; and a gateway adapted to receive the power failure message from the light control module and adapted to generate an output based on the received power failure message, wherein the failure message is in response to the power consumption value being less than a predetermined percentage of a prior power consumption value to indicate a slow failure.

21. A system comprising:

a light fixture including a plurality of luminaries;

a light control module associated with the light fixture, the light control module being adapted to determine a power failure based on the power consumption of the light fixture and being further adapted to transmit a corresponding power failure message, wherein the light control module includes:

a current and voltage sensing circuit to measure a current and a voltage provided to the light fixture, and a microcontroller to determine a power consumption value based on the measured current and the measured voltage; and a gateway adapted to receive the power failure message from the light control module and adapted to generate an output based on the received power failure message, wherein:

the microcontroller is operable to determine a standard deviation over multiple power consumption values; and the failure message is in response to the standard deviation being greater than a threshold standard deviation to indicate a striating failure.

22. A system comprising:

a light fixture including a plurality of luminaries;

a light control module associated with the light fixture, the light control module being adapted to determine a power failure based on the power consumption of the light fixture and being further adapted to transmit a corresponding power failure message, wherein the light control module includes:

a current and voltage sensing circuit to measure a current and a voltage provided to the light fixture, and a microcontroller to determine a power consumption value based on the measured current and the measured voltage; and a gateway adapted to receive the power failure message from the light control module and adapted to generate an output based on the received power failure message, wherein the failure message is in response to the power consumption value being within a range of a previous power consumption value after a change in operational state to indicate a stuck relay failure.

23. A system comprising:

a light fixture including a plurality of luminaries;

a light control module associated with the light fixture, the light control module being adapted to determine a power failure based on the power consumption of the light fixture and being further adapted to transmit a corresponding power failure message, wherein the light control module includes:

a current and voltage sensing circuit to measure a current and a voltage provided to the light fixture, and a microcontroller to determine a power consumption value based on the measured current and the measured voltage; and a gateway adapted to receive the power failure message from the light control module and adapted to generate an output based on the received power failure message, wherein the failure message is in response to the power consumption value being outside a range of a baseline value upon light fixture start-up.

* * * * *